US012212935B2

(12) United States Patent
Bergs et al.

(10) Patent No.: US 12,212,935 B2
(45) Date of Patent: Jan. 28, 2025

(54) BONE CONDUCTION CONNECTOR ASSEMBLY

(71) Applicant: Cochlear Limited, Macquarie University (AU)

(72) Inventors: Tommy Bergs, Härryda (SE); Alf Björk, Macquarie University (AU); Marcus Andersson, Gothenburg (SE)

(73) Assignee: Cochlear Limited, Macquarie University (AU)

( * ) Notice: Subject to any disclaimer, the term of this patent is extended or adjusted under 35 U.S.C. 154(b) by 364 days.

(21) Appl. No.: 17/765,261

(22) PCT Filed: Oct. 8, 2020

(86) PCT No.: PCT/IB2020/000834
§ 371 (c)(1),
(2) Date: Mar. 30, 2022

(87) PCT Pub. No.: WO2021/074682
PCT Pub. Date: Apr. 22, 2021

(65) Prior Publication Data

US 2022/0360918 A1 Nov. 10, 2022

Related U.S. Application Data

(60) Provisional application No. 62/916,898, filed on Oct. 18, 2019.

(51) Int. Cl.
*H04R 25/00* (2006.01)

(52) U.S. Cl.
CPC ....... *H04R 25/606* (2013.01); *H04R 2460/13* (2013.01)

(58) Field of Classification Search
CPC .. H04R 25/606; H04R 2460/13; H04R 11/02; H04R 25/554; H04R 11/00
See application file for complete search history.

(56) References Cited

U.S. PATENT DOCUMENTS

2005/0248158 A1 11/2005 Westerkull
2007/0053536 A1 3/2007 Westerkull
(Continued)

FOREIGN PATENT DOCUMENTS

WO 2014/097266 A2 6/2014
WO 2019/082167 A1 5/2019

OTHER PUBLICATIONS

International Search Report and Written Opinion in counterpart International Application No. PCT/US2020/000834, mailed Feb. 2, 2021, 7 pages.
(Continued)

*Primary Examiner* — Angelica M McKinney
(74) *Attorney, Agent, or Firm* — Edell, Shapiro & Finnan, LLC

(57) ABSTRACT

Examples disclosed herein are relevant to improvements in connectors for bone conduction devices, particularly bone conduction auditory prostheses, to connect to an abutment. Disclosed examples include a connector assembly having a vibration conductor separate from a coupling. Examples can further include an adapter to modify a length of the connector assembly. Examples can further provide an angled connector assembly to modify an angle at which the connector assembly connects to an abutment.

25 Claims, 10 Drawing Sheets

(56) References Cited

U.S. PATENT DOCUMENTS

| | | | | |
|---|---|---|---|---|
| 2011/0268303 | A1* | 11/2011 | Ahsani | H04R 11/02 381/151 |
| 2012/0088956 | A1* | 4/2012 | Asnes | H04R 25/606 600/25 |
| 2012/0237067 | A1 | 9/2012 | Asnes | |
| 2012/0302823 | A1* | 11/2012 | Andersson | H04R 11/00 381/326 |
| 2013/0090518 | A1 | 4/2013 | Bjorn et al. | |
| 2013/0195304 | A1 | 8/2013 | Andersson | |
| 2014/0179985 | A1* | 6/2014 | Andersson | H04R 25/606 600/25 |
| 2014/0275731 | A1* | 9/2014 | Andersson | H04R 25/606 600/25 |
| 2015/0117689 | A1* | 4/2015 | Bergs | H04R 25/606 381/322 |
| 2017/0251313 | A1* | 8/2017 | Gustafsson | H04R 25/606 |
| 2020/0296525 | A1* | 9/2020 | Nyström | H04R 25/554 |

OTHER PUBLICATIONS

Extended European Search Report in counterpart European Application No. 20877359.8-1210, mailed Oct. 27, 2023, 9 pages.

* cited by examiner

FIG. 9A
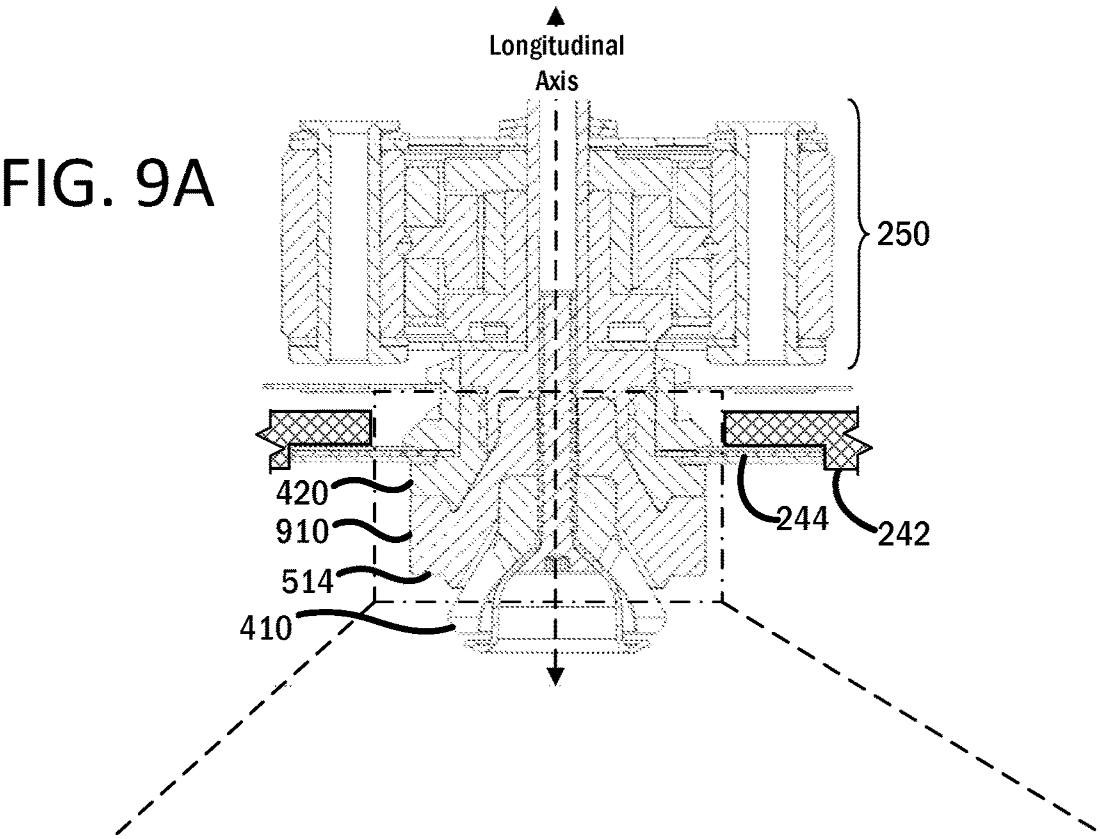
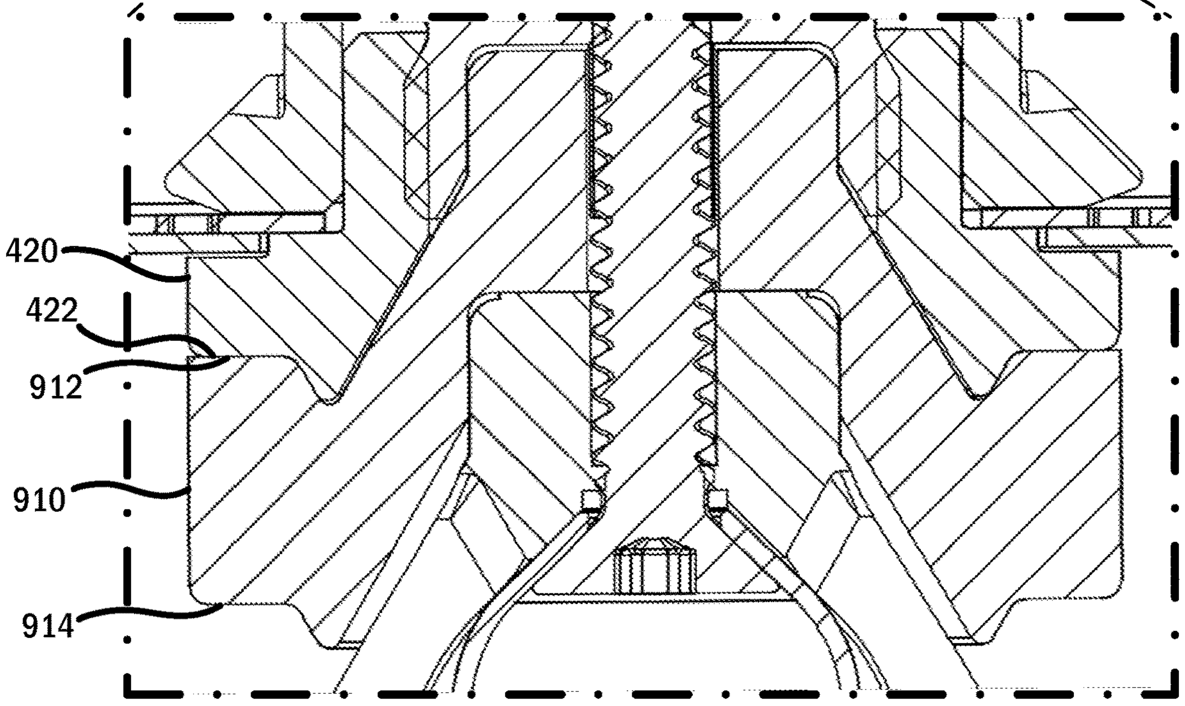
FIG. 9B

BONE CONDUCTION CONNECTOR ASSEMBLY

This application is being filed on Oct. 8, 2020, as a PCT International Patent application and claims priority to U.S. provisional patent application Ser. No. 62/916,898, filed Oct. 18, 2019, the entire disclosure of which is incorporated by reference in its entirety.

BACKGROUND

Medical devices having one or more implantable components, generally referred to herein as implantable medical devices, have provided a wide range of therapeutic benefits to recipients over recent decades. In particular, partially or fully-implantable medical devices such as hearing prostheses (e.g., bone conduction devices, mechanical stimulators, cochlear implants, etc.), implantable pacemakers, defibrillators, functional electrical stimulation devices, and other implantable medical devices, have been successful in performing lifesaving and/or lifestyle enhancement functions and/or recipient monitoring for a number of years.

The types of implantable medical devices and the ranges of functions performed thereby have increased over the years. For example, many implantable medical devices now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, the implantable medical device.

SUMMARY

In an example, there is an apparatus including a housing defining an opening; a vibratory actuator disposed within the housing; a coupling extending through the opening and configured to couple with an abutment; and a vibration conductor separate from the coupling and extending through the opening and configured to conduct vibrations from the vibratory actuator to the abutment.

In another example, there is an apparatus including: a housing; a vibratory actuator disposed within the housing; a coupling extending from the housing and having a radial retention surface for coupling with an abutment; a vibration conductor having a distal end extending from the housing and having a first axial interface surface disposed proximate the distal end configured to conduct vibrations to the abutment; and an adapter having a second axial interface surface and a third axial interface surface and being configured to be removably disposed between the coupling and the vibration conductor. The second axial interface surface can be configured to contact the first axial interface surface and conduct vibrations to the third axial interface surface. The third axial interface surface can be configured to conduct vibrations to the abutment.

In yet another example, there is an apparatus comprising: a coupling extending along an axis and having a distal end configured to couple with a percutaneous abutment radially with respect to the axis; a vibration conductor extending along the axis and configured to conduct vibrations to the percutaneous abutment in a direction parallel to a major axis of the percutaneous abutment. The coupling can be configured for flexibility. The vibration conductor can be configured for vibration transfer.

In another example, there is a method comprising: with a bone conduction device having a vibratory actuator, a coupling, and a vibration conductor: vibrating the vibratory actuator in response to a stimulus to generate vibrations; conducting the vibrations directly from the vibration conductor to an abutment of a recipient; and retaining the bone conduction device in a position relative to the abutment by providing a retaining force to the abutment via the coupling.

BRIEF DESCRIPTION OF THE DRAWINGS

FIG. 9, which is made up of FIGS. 9A and 9B, illustrates an example implementation of a connection assembly having an adapter.

DETAILED DESCRIPTION

Disclosed technology relates to improvements in connectors used by bone conduction apparatuses, such as connectors used by bone conduction auditory prostheses to connect to an abutment. Bone conduction auditory prostheses typically include a bone conduction implant (e.g., having the abutment) and a bone conduction device that houses a vibrator. The bone conduction device can be coupled to the bone conduction implant to transmit vibrations generated by the vibrator to the recipient's skull to cause a hearing percept. Traditionally, the connector of the bone conduction device is located proximate a distal end of a shaft and has a unitary structure that functions to both mechanically and vibrationally couple the bone conduction device to the bone conduction implant. The connector can greatly affect the extent to which the bone conduction device protrudes from the bone conduction implant and the perceived size of the overall auditory prosthesis. Traditional bone conduction auditory prostheses have a connector that protrudes at least 3 mm from the housing of the bone conduction device, which can contribute to approximately 20% of the total protrusion of the overall prostheses.

Contrary to traditional arrangements, disclosed examples can provide for a relatively shorter protrusion from the bone conduction implant as well as improved vibration transfer and coupling characteristics. For instance, disclosed configurations can provide a connector assembly having separate vibration transfer and coupling components. For example, a connector assembly as described herein can protrude a relatively shorter distance, such as approximately 1 mm or 8% of the total protrusion of the auditory prosthesis from the bone conduction implant. Disclosed examples can further include angled connector assemblies to correct for an angle of a bone conduction implant. An example bone conduction auditory prosthesis that can benefit from technologies herein is described in FIG. 1.

Bone Conduction Auditory Prosthesis

Figure 1:
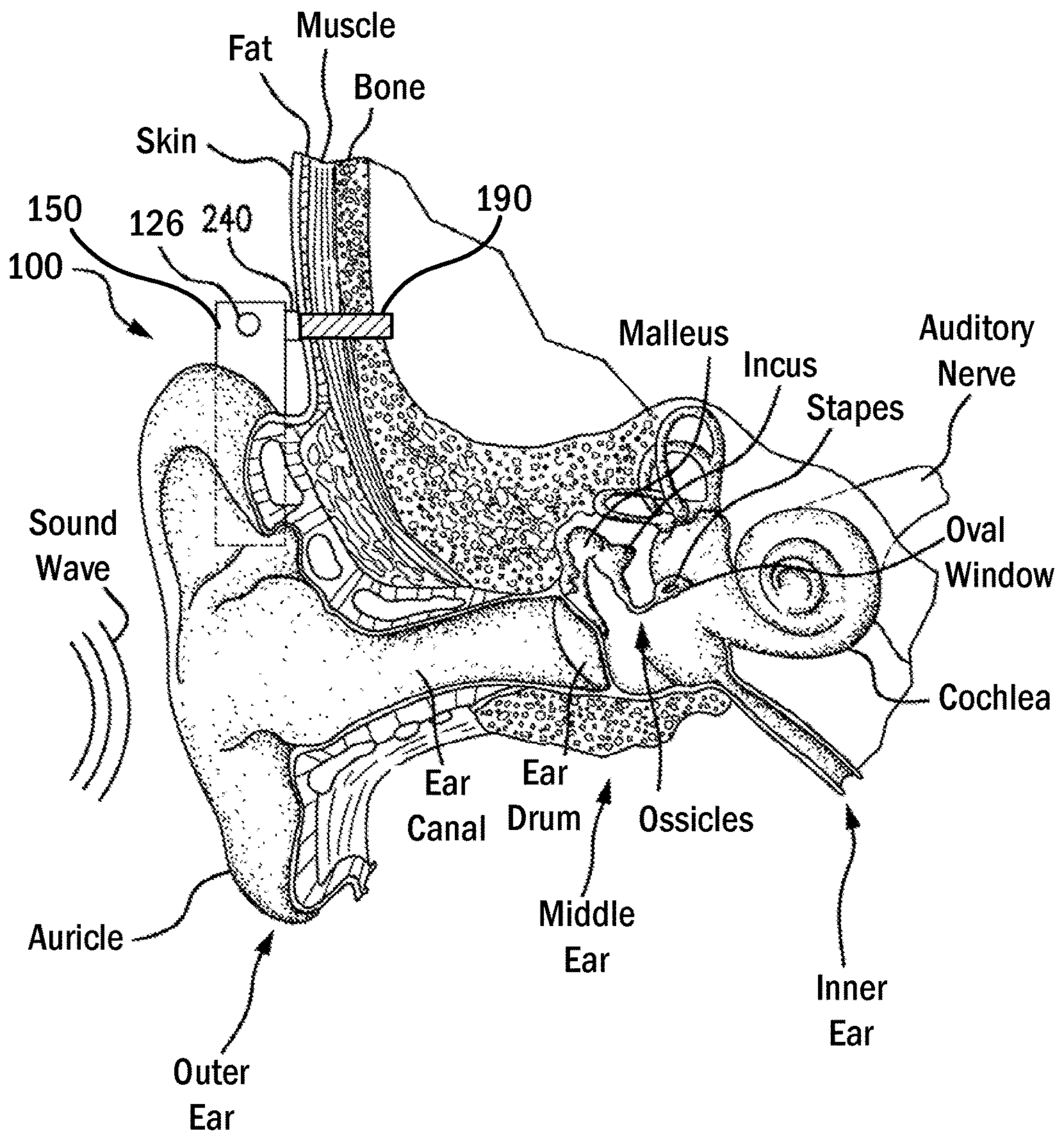
FIG. 1 is a perspective view of a bone conduction auditory prosthesis that can benefit from technologies described herein.

FIG. 1 is a perspective view of a bone conduction auditory prosthesis 100 that can benefit from technologies described herein. The bone conduction auditory prosthesis 100 is wearable by a recipient relative to an outer ear, a middle ear, and an inner ear of the recipient. Elements of the outer, middle, and inner ear are described below, followed by a description of the bone conduction auditory prosthesis 100.

In typical human hearing anatomy, the outer ear includes an auricle and an ear canal. A sound wave or acoustic pressure is collected by the auricle and channeled into and through the ear canal. Disposed across an end of the ear canal is an ear drum (also known as the tympanic membrane) that vibrates in response to the acoustic wave. This vibration is coupled to an oval window (or fenestra ovalis) through three bones of middle ear: the malleus, the incus and the stapes, which are collectively referred to as the ossicles. The ossicles serve to filter and amplify the acoustic wave, which causes the oval window to vibrate. The vibration sets up waves of fluid motion within the cochlea. This fluid motion activates hair cells that line the inside of the cochlea. Activation of the hair cells causes appropriate nerve impulses to be transferred through the spiral ganglion cells and an auditory nerve to the brain, where the nerve impulses are perceived as sound.

As illustrated, the bone conduction auditory prosthesis 100 is positioned behind the outer ear of the recipient and includes a bone conduction device 150 and a bone conduction implant 190. The bone conduction device 150 is configured to be releasably coupled to the bone conduction implant 190. By being releasably coupled, the bone conduction device 150 can be releasable in such a manner that the recipient can relatively easily attach and remove the bone conduction device 150 during normal use of the bone conduction auditory prosthesis 100. Such releasable coupling can be accomplished via a connector assembly 240 of the bone conduction device 150 and a corresponding mating portion of the bone conduction implant 190, as is detailed below. As described in more detail in FIG. 2, the bone conduction device 150 can include a sound input device 126, a sound processor, a vibratory actuator, and various other operational components.

As illustrated, the bone conduction device 150 further includes a connector assembly 240 configured to removably attach the bone conduction device 150 to the bone conduction implant 190, which is at least partially implanted in the recipient. In the illustrated example of FIG. 1, the connector assembly 240 is connected to the bone conduction implant 190 implanted in the recipient. An example implementation of the bone conduction implant 190 is shown and described in more detail in FIG. 2.

It is noted that while many of the details of the embodiments presented herein are described with respect to a percutaneous bone conduction device, some or all of the teachings disclosed herein may be utilized in other devices. For example, disclosed examples can be used with transcutaneous bone conduction devices where the bone conduction device 150 is connectable to a bone conduction device support (e.g., the COCHLEAR BAHA SOUNDARC or BAHA SOFTBAND) having a component to receive the bone conduction device 150 and being configured to hold a plate or other vibration conductor against the recipient's skin. An example of such a bone conduction device support is described in U.S. Pat. No. 9,906,853, which is titled "Bone Conduction Device Support" and which is hereby incorporated by reference in its entirety for any and all purposes. Technology described herein can be used in other ways as well, such as in situations where vibration transfer between components is desired.

Figure 2:
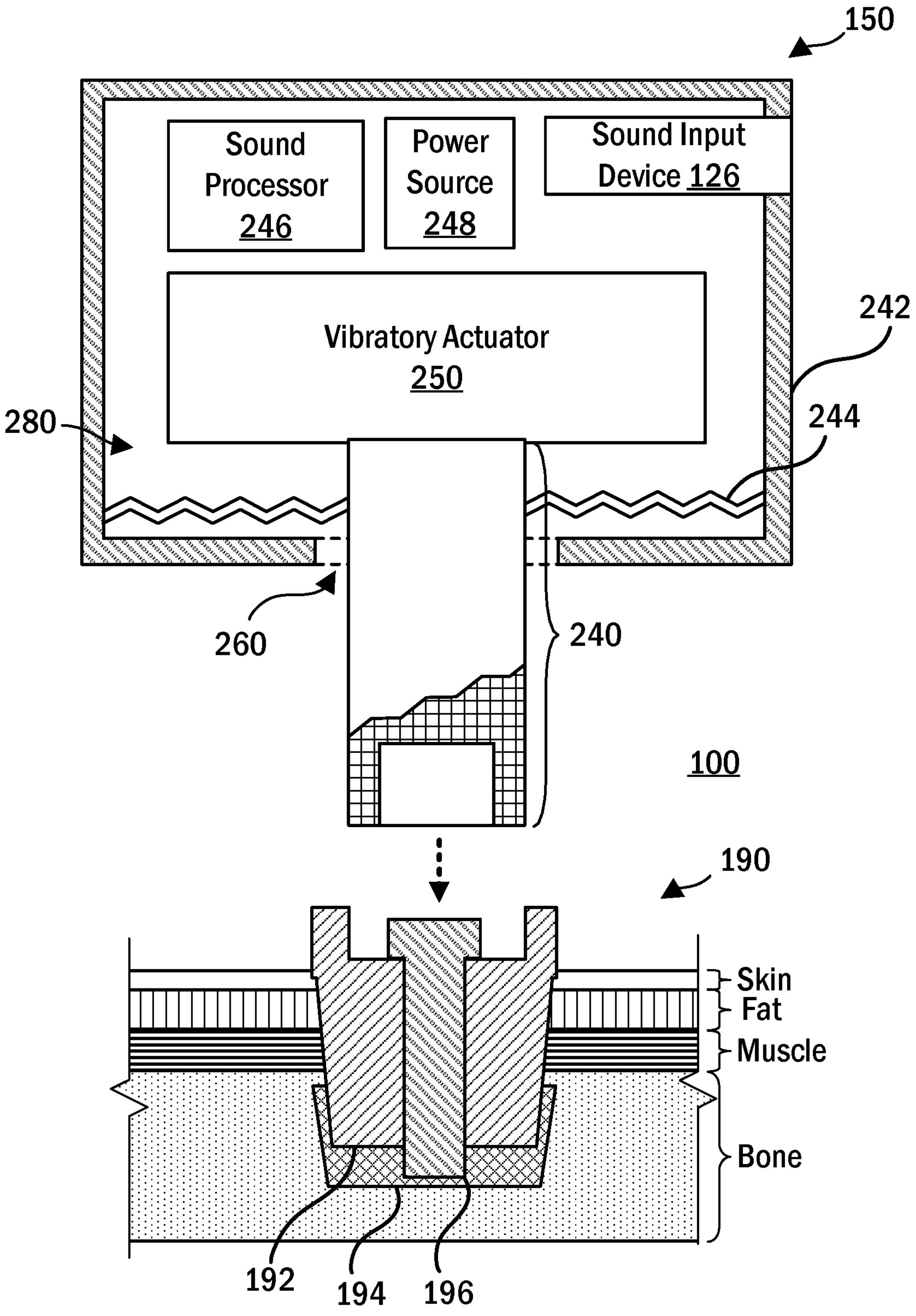
FIG. 2 illustrates an example implementation of the bone conduction apparatus having a bone conduction device and a bone conduction implant.

FIG. 2 illustrates an example partial cutaway view of the bone conduction auditory prosthesis 100 of FIG. 1, including the bone conduction device 150 and the bone conduction implant 190. The bone conduction device 150 includes a housing 242, a power source 248, a sound processor 246, the sound input device 126, and a connector assembly 240, among other components.

The sound input device 126 is a component configured to receive sound signals and can be or include a microphone, a telecoil, a wireless transceiver (e.g., configured to receive BLUETOOTH or other wireless signals, which can transmit sound data), other components, or combinations thereof. The sound input device 126 can be located at various locations, such as on the bone conduction device 150, in the bone conduction device 150, or coupled to the bone conduction device 150 (e.g., via a cable extending from the bone conduction device 150). Sound signals received by the sound input device 126 can be provided as electrical signals to the sound processor 246.

The sound processor 246 can be a component configured to use one or more of a plurality of techniques to selectively process, amplify, and/or filter electrical signals from the sound input device 126 or another location to generate a processed signal. The processed signal can be provided to the vibratory actuator 250 directly or via one or more transducer drive components to produce a drive signal to ultimately cause the vibratory actuator 250 to vibrate. The vibrations can be conducted to the recipient's skull via the connector assembly 240 to cause a hearing percept in the recipient.

The power source 248 is a component that provides electrical power to one or more components of bone conduction device 150. In many examples, the power source 248 is a rechargeable battery and the bone conduction device 150 can include a port for receiving a charging cable to charge the power source 248.

The connector assembly 240 is an assemblage for connecting the bone conduction device 150 to the bone conduction implant 190. As illustrated, a proximal portion of the connector assembly 240 can connect to the vibratory actuator 250 and a distal portion of the connector assembly 240 can extend from the housing 242. The illustrated example shows the housing 242 defining an opening 260 through which the connector assembly 240 extends. Collectively, the connector assembly 240 and vibratory actuator 250 form an actuator-connector assembly 280, which is described in more detail in FIG. 3. The actuator-connector assembly 280 can be suspended in the housing 242 by one or more resilient attachments 244, such as via one or more springs. In an example embodiment, the resilient attachments 244 is connected to the connector assembly 240, and the vibratory actuator 250 is supported by the connector assembly 240.

The vibratory actuator 250 can be a component configured to produce vibrations (e.g., a vibrating electromagnetic actuator or a vibrating piezoelectric actuator) and is disposed in the housing 242. The bone conduction device 150 can be configured to receive sound at the sound input device 126, convert the received sound into electrical signals. The electrical signals can be processed by the sound processor 246, which then generates control signals that cause the vibratory actuator 250 to vibrate. In other words, the vibratory actuator 250 converts the electrical signals into mechanical motion to impart vibrations to the recipient's skull.

As will be understood, the bone conduction device 150 can include more or fewer components than those in the example illustration. For example, the bone conduction device 150 can include a user interface over which the bone conduction device 150 can receive input from and provide output to a user. The bone conduction device 150 can further include an external device interface to connect the bone conduction device 150 to one or more external devices, such as a fitting system or a user's device (e.g., a phone, tablet, laptop, or desktop computer). Using external device interface, an external device can obtain and modify information for the various components of bone conduction device 150, such as via a wired or wireless connection.

The bone conduction implant 190 includes an abutment 192 that which is secured to a bone fixture 194 via an abutment screw 196. The abutment 192 extends from the bone fixture 194 which is screwed into bone, through muscle, fat, and skin so that the connector assembly 240 can be attached thereto. Such an abutment 192 provides an attachment location for the connector assembly 240 and facilitates efficient transmission of vibrations from the vibratory actuator 250 through the connector assembly 240 and to the bone. In some examples, the bone conduction implant 190 can be implemented using one or more of the components and techniques described in US 2010/0286776, which is titled "Percutaneous Bone Conduction Implant", and which is hereby incorporated by reference herein in its entirety for any and all purposes.

Figure 3:
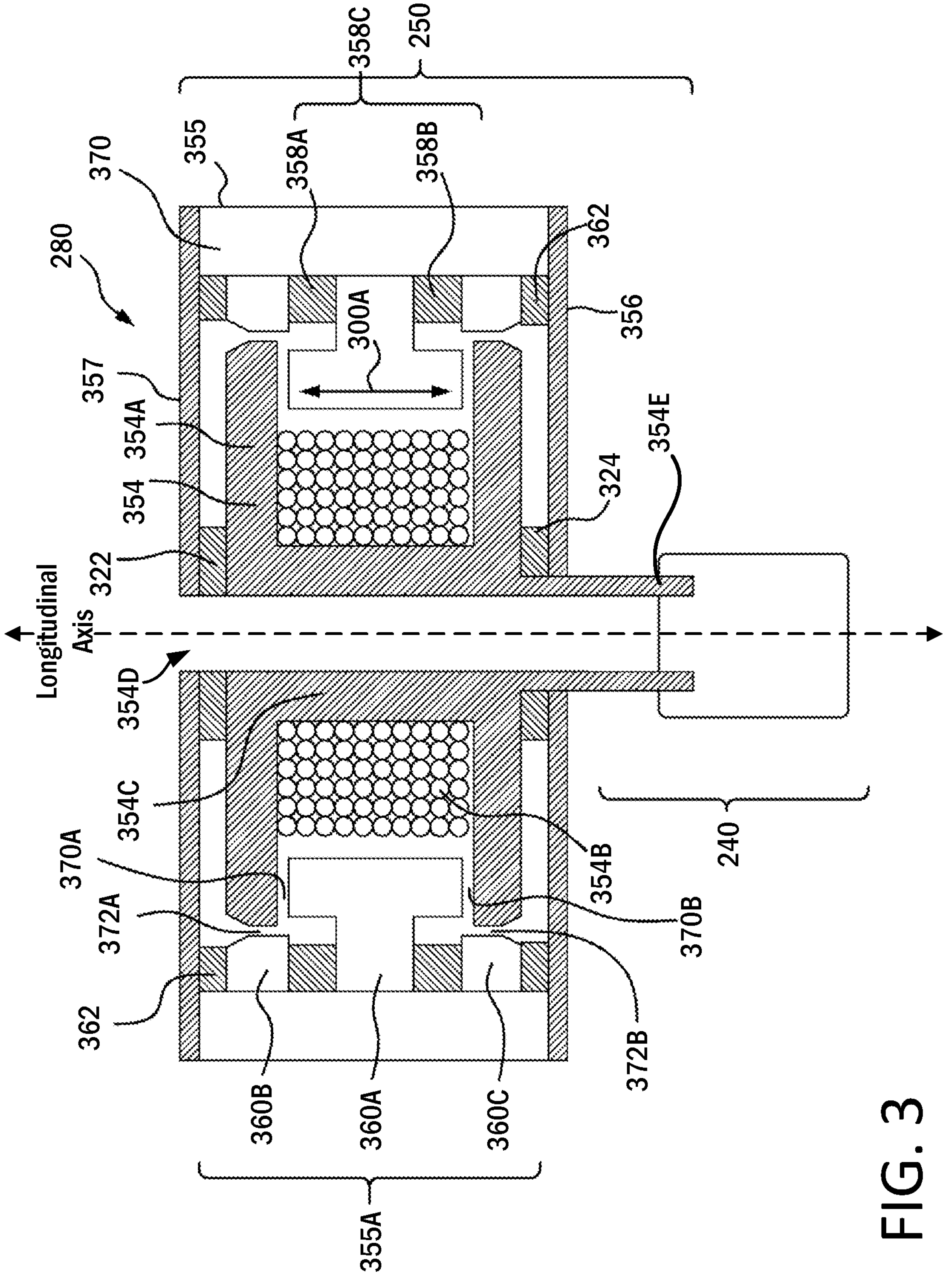
FIG. 3 is a cross-sectional view of an example implementation of an actuator-connector assembly.

FIG. 3 is a cross-sectional view of an example implementation of the actuator-connector assembly 280 of FIG. 2. In order to better convey the concepts of the teachings herein, the background lines of the cross-sectional views are not depicted in the figures. It is to be understood that in at least the case of the vibratory actuator 250 being radially symmetric, components (e.g., resilient attachments, a bobbin, etc.) can extend about a longitudinal axis of the vibratory actuator 250. The illustrated actuator-connector assembly 280 includes the vibratory actuator 250 and the connector assembly 240. The connector assembly 240 can be mounted on a bobbin extension 354E. Details regarding the connector assembly 240 are described in more detail in FIG. 4.

The vibratory actuator 250 includes a bobbin assembly 354 and a counterweight assembly 355. As illustrated, the bobbin assembly 354 includes a bobbin 354A and a coil 354B that is wrapped around a core 354C of the bobbin 354A. In the illustrated embodiment, the bobbin assembly 354 is radially symmetrical. The vibratory actuators 250 detailed herein can be radially symmetrical.

The counterweight assembly 355 includes resilient attachments 356 and 357, permanent magnets 358A and 358B, yokes 360A, 360B and 360C, spacers 362, and a counterweight mass 370. The spacers 362 provide a connective support between the resilient attachments 356 and the other elements of the counterweight assembly 355, but in some embodiments, spacers are not present, and the resilient attachments 356 and 357 are connected only to the counterweight mass 370, while in other embodiments, the resilient attachments 356 and 357 are only connected to the spacers 362. The resilient attachments 356 and 357 can connect the bobbin assembly 354 via the spacers 322 and 324 to the rest of counterweight assembly 355 and permit the counterweight assembly 355 to move relative to the bobbin assembly 354 upon interaction of a dynamic magnetic flux produced by the coil 354B. In an example, the spacers 322, 324 are constructed from turned aluminum or molded plastic. The static magnetic flux can be produced by the permanent magnets 358A and 358B of the counterweight assembly 355. In this regard, the counterweight assembly 355 is a static magnetic field generator, where the permanent magnets 358A and 358B can be arranged such that their respective south poles face each other and their respective north poles face away from each other. In other embodiments, the respective south poles can face away from each other and the respective north poles can face each other.

The coil 354B, in particular, can be energized with an alternating current to create a dynamic magnetic flux about the coil 354B. In an example embodiment, the bobbin 354A is made of a soft iron. The iron of the bobbin 354A is conducive to the establishment of a magnetic conduction path for the dynamic magnetic flux. In an example, the yokes of the counterweight assembly 355 are made of soft iron also conducive to the establishment of a magnetic conduction path for the static magnetic flux. The soft iron of the bobbin 354A and yokes 360 can be of a type that increases the magnetic coupling of the respective magnetic fields, thereby providing a magnetic conduction path for the respective magnetic fields.

As may be seen, the vibratory actuator 250 includes axial air gaps 370A and 370B that are located between the bobbin assembly 354 and the counterweight assembly 355. With respect to a radially-symmetrical bobbin assembly 354 and the counterweight assembly 355, the air gaps 370A and 370B can extend in the direction of the primary relative movement between the bobbin assembly 354 and the counterweight assembly 355 indicated by arrow 300A.

The vibratory actuator 250 can include two radial air gaps 372A and 372B that are located between the bobbin assembly 354 and the counterweight assembly 355. With respect to the radially symmetrical bobbin assembly 354 and the counterweight assembly 355, the air gap can extend about the direction of relative movement between the bobbin assembly 354 and the counterweight assembly 355. The permanent magnets 358A and 358B can be arranged such that their respective south poles face each other and their respective north poles face away from each other.

The radial air gaps 372A and 372B can close static magnetic flux between the bobbin 354A and the yokes 360B and 360C, respectively. Further, the axial air gaps 370A and 370B close the static and dynamic magnetic flux between the bobbin 354A and the yoke 360A. In the illustrated implementation, there are four air gaps.

The illustrated vibratory actuator 250 is a balanced actuator. In alternate configurations a balanced actuator can be achieved by adding additional axial air gaps above and below the outside of the bobbin 354A (and in some variations thereof, the radial air gaps are not present due to the addition of the additional axial air gaps). In such an alternate configuration, the yokes 360B and 360C are reconfigured to extend up and over the outside of the bobbin 354A (the geometry of the permanent magnets 358A and 358B and/or the yoke 360A can be reconfigured to achieve utility of the actuator). Some examples can use fewer air gaps than the illustrated configuration. Some embodiments can use four axial air gaps and no radial air gaps. In some examples, fewer air gaps can be utilized.

The operational features of the vibratory actuator 250 can correspond to some or all of those of the examples (and variations thereof) disclosed in U.S. Pat. No. 8,565,461, titled "Bone Conduction Device Including a Balanced Electromagnetic Actuator Having Radial and Axial Air Gaps", and U.S. Pat. No. 9,716,953, titled "Electromagnetic Transducer with Specific Internal Geometry", which are hereby incorporated herein by reference for any and all purposes.

The illustrated vibratory actuator 250 defines a bore 354D passing all the way through the vibratory actuator 250. More particularly, the bobbin 354A (including in some instances, the bobbin extension 354E) can define the bore 354D. The spacers 322 and 324 and resilient attachments 356 and 357 can also have a space in the form of a bore that passes all the way therethrough. These spaces can constitute a passage through the spacers and 322 and 324 through the springs. In the illustrated example, the space extends from one side of the bobbin 354A to another side of the bobbin 354A, and a plane bifurcating the bobbin normal to a direction of extension of the space extends through no component within the space. While the illustrated example includes a passage from the space within the bobbin 354A to the connection apparatus that is not obstructed, other embodiments can include a configuration where space forming a passage is filled or otherwise contains other solid or liquid material, but there still exists a passage providing that this material is removable. Further along these lines, even if the space within the bobbin 354A is filled with or otherwise contains other solid or liquid material, the space still exists providing that the material is removable. For example, the material can be removed without altering the structure in a manner such that reversing the operation or otherwise replacing the removed material with new material will result in restoring the structure to its original form. Material that can be removed only via drilling, for example, is not removable, whereas a component that can be plastically deformed for removal, and replaced with a new component to achieve the prior form is removable.

The coils 354B wound about the bobbin 354A, which are configured to generate dynamic magnetic flux, extend about the space within the bobbin. The connector assembly 240 can be in fixed relationship to the bobbin assembly 354 in general, and the bobbin 354A in particular. The connector assembly 240 can be configured to transfer vibrational energy from the vibratory actuator 250.

While the illustrated example shows the connector assembly 240 being directly fixed to bobbin assembly 354, in an alternate embodiment, an intervening component between the two components can be present such that the connector assembly 240 is indirectly fixed to the bobbin assembly 354. Accordingly, while the connector assembly 240 transfers vibrational energy directly to or from the vibratory actuator 250, in other embodiments, the connector assembly 240 may indirectly transfer vibrational energy to or from the vibratory actuator 250. Along these lines, while the bobbin extension 354E is depicted as being a part of a monolithic bobbin 354A, as noted above, bobbin extension 354E, or at least the portion of that component to which the connector assembly 240 is attached, can be a separate component from the vibratory actuator 250. An example implementation of the connector assembly 240 is described in more detail in relation to FIGS. 4-6.

Connector Assembly

Figure 4:
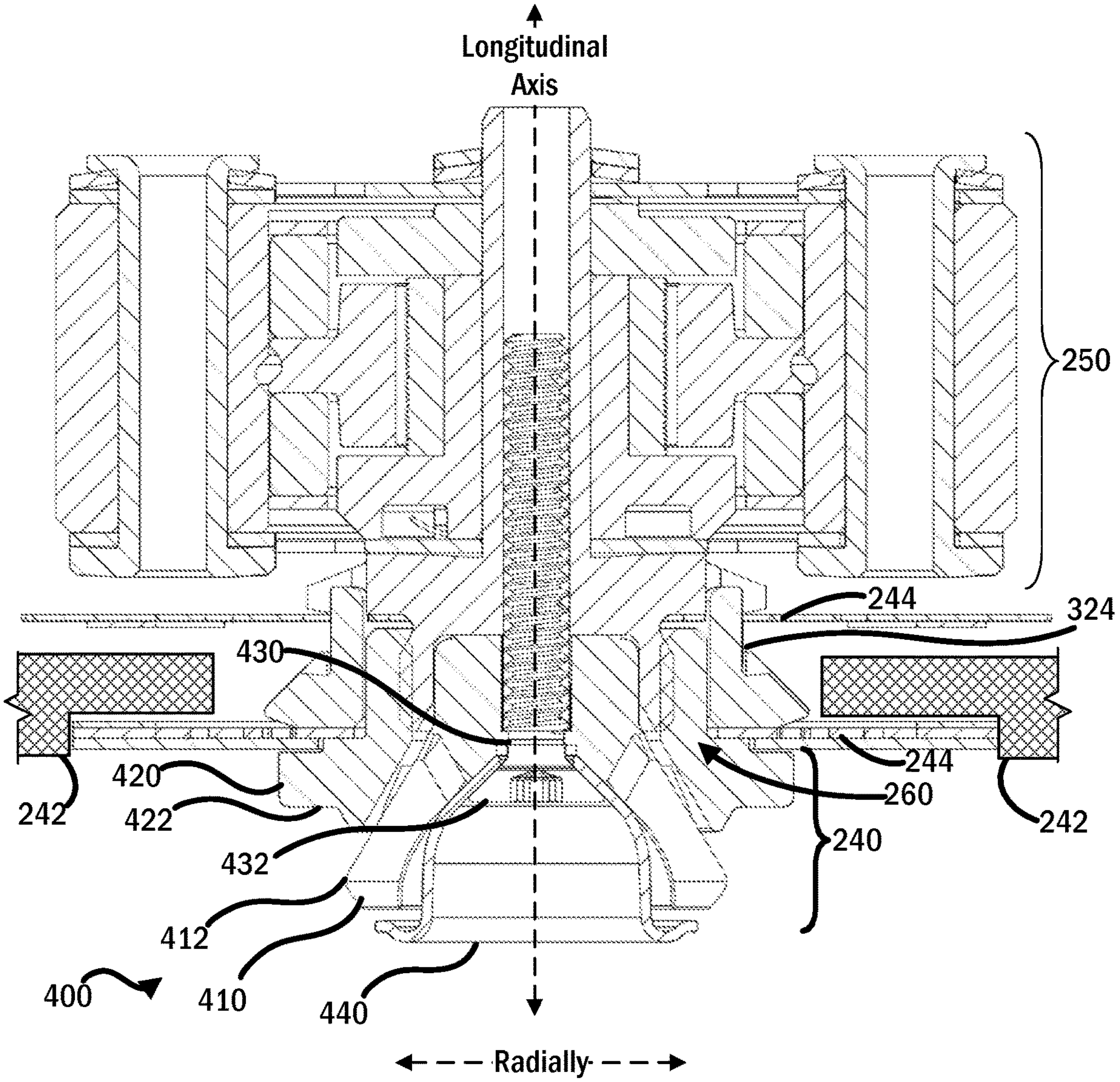
FIG. 4 illustrates a cutaway view of an example implementation of a connector assembly.
Figure 5:
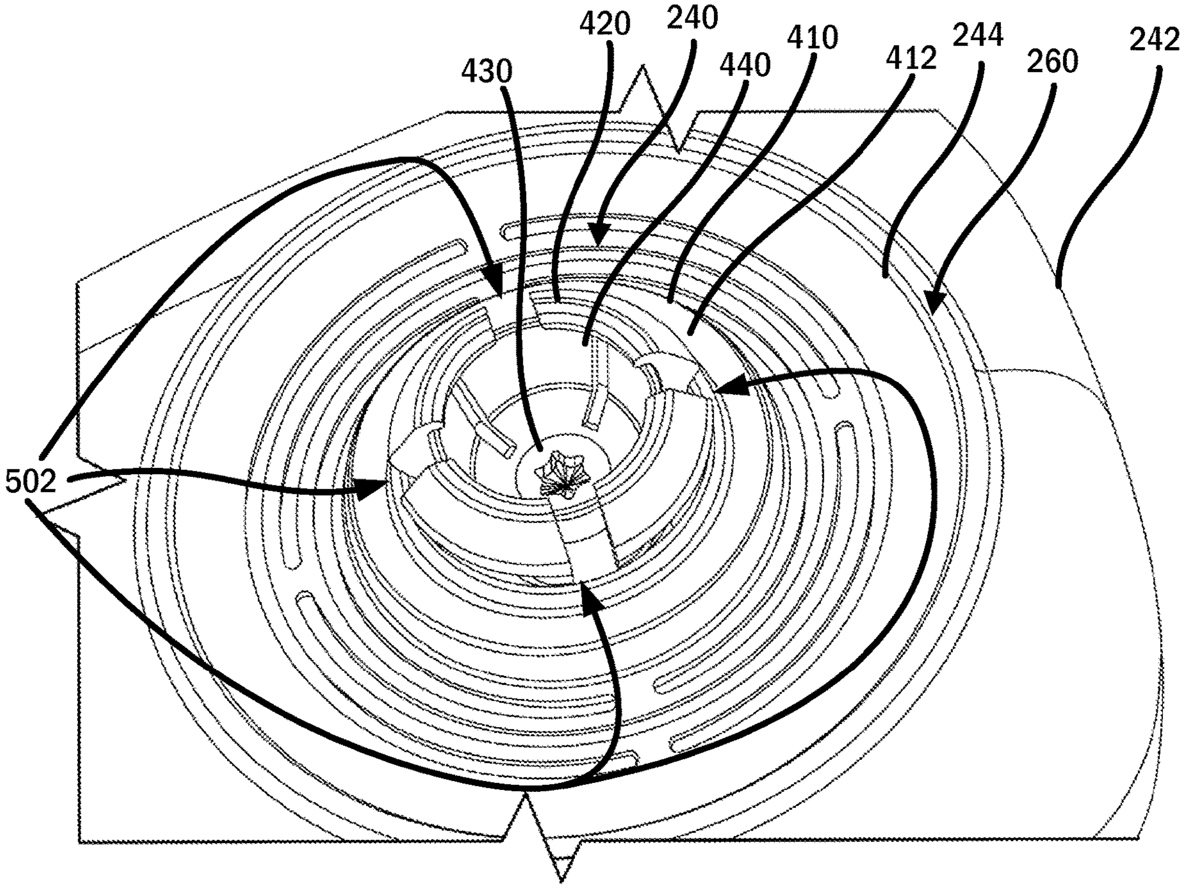
FIG. 5 illustrates a perspective view of the example implementation of FIG. 4.
Figure 6:
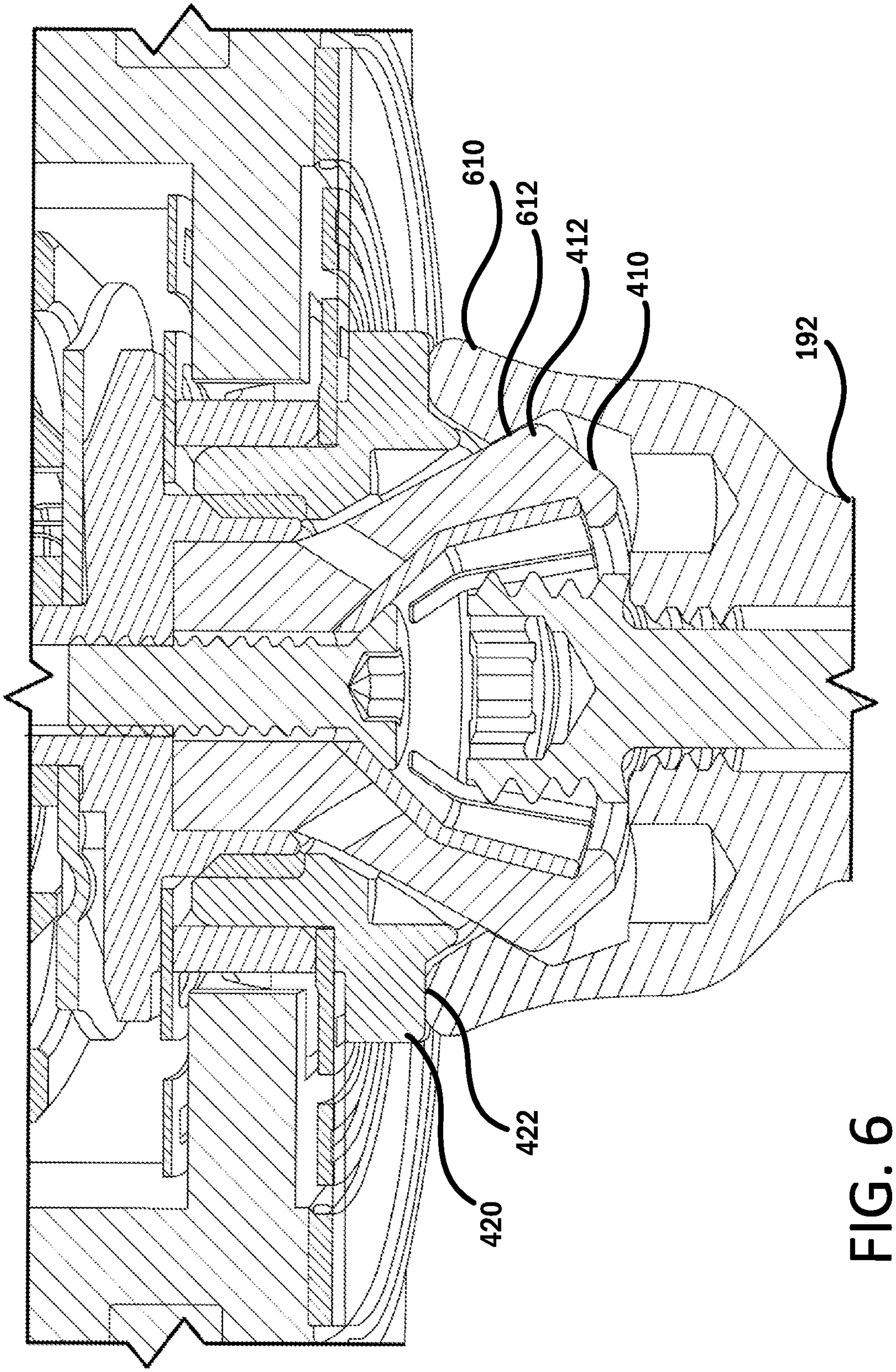
FIG. 6 illustrates an example connection between the connection assembly of the bone conduction device and the bone conduction implant.

FIGS. 4-6 illustrate additional details regarding the connector assembly 240. In particular, FIG. 4 illustrates a cutaway view of an example implementation of the connector assembly 240. FIG. 5 illustrates a perspective view of the example implementation of FIG. 4. FIG. 6 illustrates an example connection between the connector assembly 240 and the bone conduction implant 190.

As illustrated in the figures, the connector assembly 240 can include two primary components: a coupling 410 and a vibration conductor 420. The coupling 410 and the vibration conductor 420 can extend through the opening 260 of the housing 242 along the longitudinal axis of the vibratory actuator 250. Both the coupling 410 and the vibration conductor 420 can have proximal ends disposed within the housing 242 of the bone conduction device 150 and distal ends disposed outside of the housing 242. The connector assembly 240 can further include a fastener 430 and a sleeve 440, among other components.

The coupling 410 is a component configured to couple with the bone conduction implant 190 (e.g., the abutment 192 thereof). The coupling 410 can couple with the bone conduction implant 190 in any of a variety of ways. As illustrated, the coupling 410 can be configured as a snap fastener. In particular, the coupling 410 can couple with bone conduction implant 190 by deforming when in substantial compressive contact with the abutment 192 of the bone conduction implant 190, such as may result from a user pressing the coupling 410 against the abutment 192. As can be seen in FIG. 6, a maximum diameter of the coupling 410 can be less than a maximum diameter of the abutment 192. For instance, the maximum diameter of the abutment 192 could be approximately 7.5 mm. The abutment 192 can include a sidewall 610 having a lip 612 or another attachment feature within a concavity defined by the sidewall 610 having a smaller maximum inner diameter than a maximum diameter of the coupling 410. Thus, when the coupling 410 is pressed into the abutment 192, the coupling 410 will elastically deform radially inward to accommodate the lip 612 or another attachment feature. Once portion of the coupling 410 having the greatest diameter passes the lip 612, the coupling 410 begins to elastically expand radially outward and a radial retention surface 412 of the coupling 410 presses against a surface of the lip 612 of the sidewall 610 (e.g., the coupling 410 "snaps" into place), which can still at least slightly limit the expansion of the coupling 410. In this manner, the coupling 410 presses against the abutment 192 and retains the bone conduction device 150 relative to the bone conduction implant 190. In this manner, the coupling 410 establishes a mechanical connection between the coupling 410 and the abutment 192, thereby retaining the bone conduction device 150 in a position relative to the bone conduction implant 190. For example, once coupled, the interaction between the coupling 410 and the abutment 192 can resist movement of the bone conduction device 150 relative to the bone conduction implant 190. In particular, the coupling 410 can resist movement unless a sufficient amount of removal force is applied to cause the coupling 410 to deform to allow the coupling 410 to pass the lip 612. The connection provided by the coupling 410 can not only resist movement of the bone conduction device 150 relative to the bone conduction implant 190, but it can also force an axial interface surface 422 of the vibration conductor 420 against the abutment 192 (e.g., by pulling the axial interface surface 422 against the abutment 192) to facilitate the conduction of vibrations from the vibratory actuator 250 to the abutment 192.

The portion of the coupling 410 that deforms when coupling with the abutment 192 can, but need not, be continuous. In many examples the coupling 410 includes relief features 502 or is divided into completely separate sections (e.g., four separate sections) to accommodate deformation of the coupling 410 as it couples with the abutment 192. For instance, the illustrated example of FIG. 5 shows a coupling 410 defining four relief features 502 in the form of regions lacking material (e.g., cutouts) that help the coupling 410 accommodate deformation during use.

As illustrated and discussed above, the radial retention surface 412 of the coupling 410 can interface with the abutment 192. The radial retention surface 412 can be one or more surfaces of the coupling 410 configured to be in contact with and apply force to the abutment 192. The radial retention surface 412 can extend circumferentially around the coupling 410 and can be broken up by the relief features 502. The radial retention surface 412 can be configured to provide force to the abutment 192 radially outward from longitudinal axis along which the coupling 410 extends. The radial retention surface 412 can provide force to pull the bone conduction device 150 toward the abutment 192 to facilitate contact between the abutment 192 and the vibration conductor 420.

The radial retention surface 412 (and the coupling 410 more broadly) can lack a feature configured to conduct vibrations to the abutment 192. For example, while the interface between the coupling 410 and the abutment 192 may result in some vibration transfer, the coupling 410 can lack a component configured to facilitate such transfer. The vibration transfer via the coupling 410 can be substantially less than the vibration transfer caused due to the vibration conductor 420. In examples, the amount of vibration transfer contributed by the coupling 410 is less than 25%, 20%, 15%, 10%, 5%, 2.5%, 1%, 0.5%, or 0.1% of the total amount of vibrational force transmitted by the connector assembly 240 to the abutment. The coupling 410 can be configured to provide radial retention force rather than being configured to directly facilitate the axial (e.g., along the longitudinal axis) transfer of vibrations.

With the coupling 410 being separate from the vibration conductor 420, the coupling 410 can be constructed from a material having beneficial properties relating to durability and wear resistance. In examples, the coupling 410 can be constructed from a plastic, such as molded PEEK. Advantageously, with the coupling 410 being separate from the vibration conductor 420, the coupling can be configured to have properties (e.g., material properties and structural properties) conducive to retaining the bone conduction device 150 to the abutment 192 even though such properties may make the coupling 410 less suited to transferring vibrations.

While the coupling 410 is shown and described as being receivable within the abutment 192, in other embodiments, this can be reversed. For instance, the coupling 410 can deform radially outward to receive the abutment 192 within the coupling. The coupling 410 can provide force pressing radially inward to the abutment 192. In addition, while the coupling 410 has primarily been described as a connecting to the abutment 192 via a snap mechanism, the coupling 410 can be implemented in other ways. For instance, in addition or instead, the coupling 410 can provide a magnetic coupling force to retain the bone conduction device 150 relative to the bone conduction implant 190. In addition or instead, the coupling 410 can provide a structure (e.g., a ball or detent) for providing a ball-and-detent coupling. In addition or instead, the coupling 410 can provide a threaded connection. In addition or instead, the coupling 410 can hook over a portion of the abutment 192 to connect.

The vibration conductor 420 is a component separate from the coupling 410 and configured to conduct vibrations from the vibratory actuator 250 to the bone conduction implant 190 (e.g., the abutment 192 thereof). For instance, the vibration conductor 420 can have one or more axial interface surfaces 422 arranged to conduct vibrations to the abutment 192 in a direction parallel to the axis along which the vibration conductor 420 extends (e.g., the longitudinal axis). The vibration conductor 420 can be configured to conduct vibrations to the abutment 192 in a direction parallel to a major axis of the bone conduction implant 190. As illustrated, an example axial interface surface 422 can be perpendicular to the longitudinal axis along which the vibration conductor 420 extends. The axial interface surface 422 can have a topology configured to match a topology of the abutment 192 to facilitate vibration transfer. In the illustrated example, the topology of the vibration conductor 420 includes a flange extending from an inner portion of the vibration conductor 420. This flange can help resist radial movement of the bone conduction device 150 relative to the abutment 192. For instance, whereas the relatively more deformable coupling 410 may allow a certain amount of undesirable radial movement, the flange can help keep resist radial movement of the bone conduction device 150.

The vibration conductor 420 can be configured to conduct vibrations by having one or more features for conducting vibrations to the bone conduction implant 190. The vibration conductor 420 can be configured to conduct vibrations by being made of a material selected to have material properties beneficial for conducting vibrations. For instance, the vibration conductor 420 can be constructed from a relatively hard material to conduct the vibrations. The vibration conductor 420 can be constructed from a harder material than the material from which the coupling 410 is constructed. In an example, the vibration conductor 420 is constructed from a metal, such as a material comprising aluminum or steel.

The vibration conductor 420 can lack features configured to couple with the abutment 192. For instance, the vibration conductor 420 can lack a feature configured to prevent the bone conduction device 150 from moving in a direction relative to the bone conduction implant 190. For instance, the vibration conductor 420 can permit movement of the bone conduction device 150 in a direction parallel to the longitudinal axis. In an example, the vibration conductor 420 lacks relief features (e.g., relief features 502). For instance, the vibration conductor 420 can be a continuous structure, such as by having a substantially consistent cross section around the longitudinal axis (e.g., lacking changes in cross sectional shape as would be the case were there relief features in the vibration conductor 420). In this manner, the vibration conductor 420 can facilitate a seal with the abutment 192 that resists the entry of contaminants (e.g., dust, dirt, or bacteria) when worn by the recipient. An outer surface of the connector assembly 240 can be smooth (e.g., lacking cracks, crevices, or openings) to reduce the risk of contaminant entry to reduce the risk for infections.

The fastener 430 can be a component configured to removably couple the coupling 410 and the vibration conductor 420 to a location within the housing 242. For instance, the fastener 430 can fasten the coupling 410 and the vibration conductor 420 relative to the vibratory actuator 250. The fastener 430 can fasten the vibration conductor 420 sufficiently tightly relative to the vibratory actuator 250 to facilitate the vibration conductor 420 receiving and conducting vibrations from the vibratory actuator 250. In an example, the fastener 430 takes the form of a bolt or screw having threads (e.g., a TORX M1×4 or TORX M1×6 fastener). As illustrated, the fastener 430 can include a head 432 disposed within a concavity of the distal end of the coupling 410. The coupling 410 can include a concavity that accommodates the fastener 430. The concavity can also facilitate radially inward deformation of the coupling 410. In some examples, the head 432 of the fastener 430 is directly in contact with the coupling 410. But in the illustrated example, the head 432 of the fastener 430 is in direct contact with the sleeve 440.

The fastener 430 can be non-destructively removed by a user without opening the housing 242. For instance, the head 432 of the fastener 430 can be accessible to a user when the bone conduction device 150 is not being worn. The fastener 430 can be removed to allow the user to replace or reconfigure the components of the connector assembly 240. In some examples, the fastener 430 can be removed to allow the components of the connector assembly 240 to be replaced to accommodate different kinds of abutments 192 (e.g., by changing an existing coupling 410 to another kind of coupling 410 configured to attach to a different kind of abutment 192). The fastener 430 can be sized to accommodate the insertion of an adapter (described in more detail below) into the connector assembly 240 to, for example, modify a length of the connector assembly 240.

The sleeve 440 can be a component configured to be disposed within a concavity of the coupling 410 and receive the fastener 430. The sleeve 440 can be configured to act as a washer to facilitate the distribution of force by the head 432 to resist the head 432 damaging the coupling 410 or another component. The sleeve 440 can be configured to be substantially flexible or rigid. The sleeve 440 can be constructed from any of a variety of materials, such as a polymer material (e.g., turned PEEK) or stamped stainless steel.

The components of the connector assembly 240 can be disposed in a coaxial relationship with respect to the longitudinal axis. For example, the coupling 410, the vibration conductor 420, the fastener 430, and the sleeve 440 can be coaxial with respect to the longitudinal axis. The coupling 410 can be concentrically disposed around the fastener 430. The sleeve 440 can be concentrically disposed around the fastener 430 as well. The vibration conductor 420 can be concentrically disposed around the coupling 410. In another example, the coupling 410 can be concentrically disposed around the vibration conductor 420. As illustrated, there can be some overlap in the positioning of the components. In an example, the concentricity is with respect to a maximum diameter of the components. For instance, the maximum diameter of the vibration conductor 420 can be greater than that of the coupling 410, which can be greater than that of the sleeve 440, which can be greater than that of the fastener 430.

The configurations of the connector assembly 240 described above can provide beneficial feedback and resonance characteristics compared to prior implementations, such as is described in the following section.

Feedback and Resonance Characteristics

Figure 7:
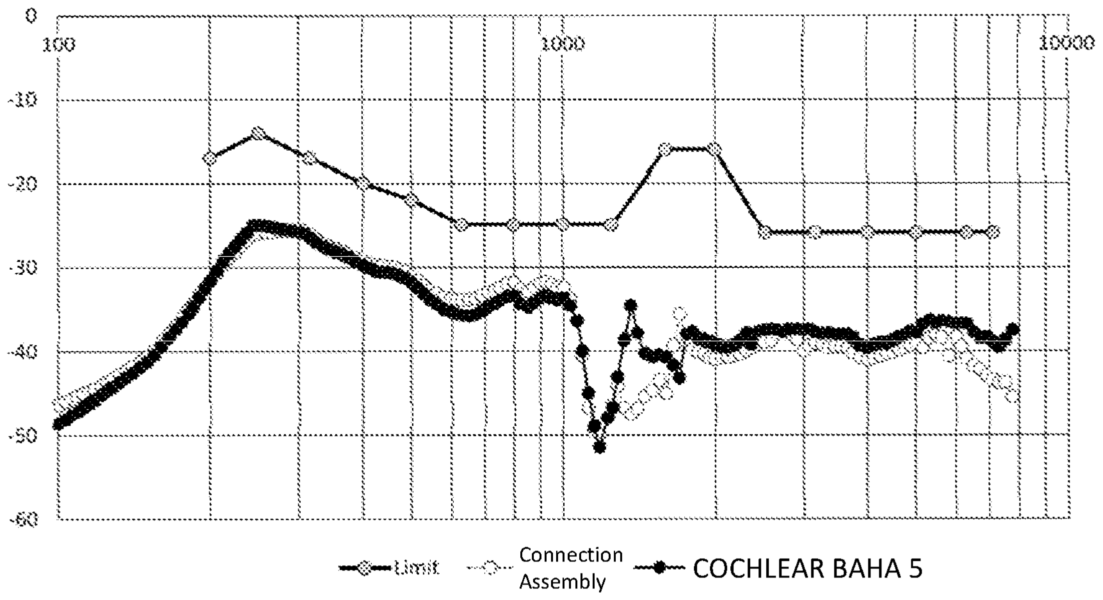
FIG. 7 illustrates an example chart comparing the feedback characteristics between a device having a connection assembly as described herein and the COCHLEAR BAHA5 device.

FIG. 7 illustrates an example chart comparing the feedback characteristics between a device having a connector assembly 240 as described herein having separate coupling 410 and vibration conductor 420 components and the COCHLEAR BAHA 5 device, which has a combined coupling-vibration structure. As can be seen, a device having a connector assembly 240 as described herein can have feedback characteristics that are below a feedback limit and comparable to existing devices despite the modified connector assembly 240.

Figure 8:
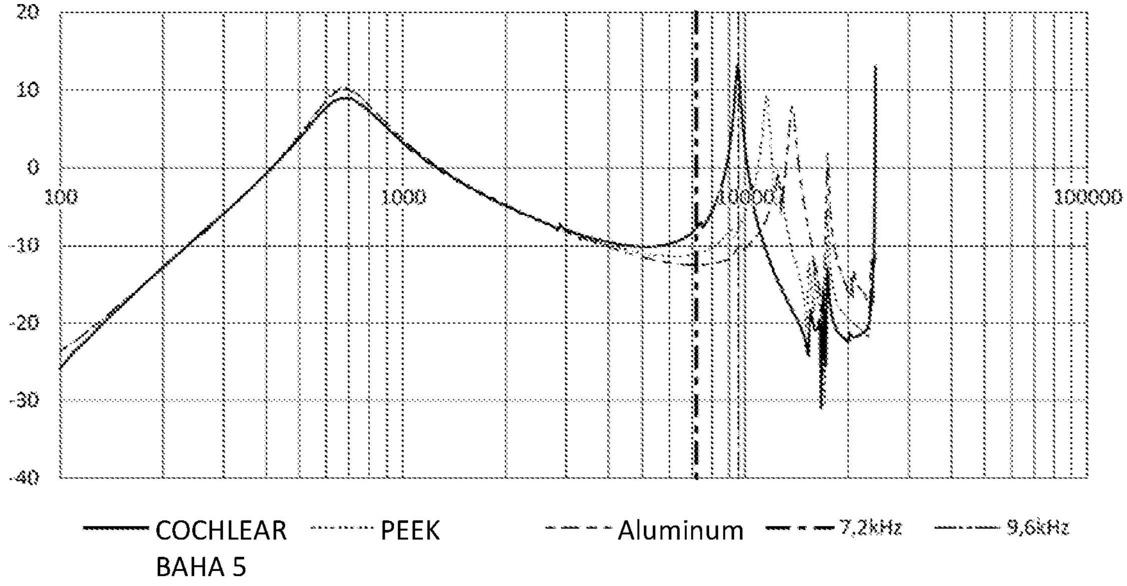
FIG. 8 illustrates an example chart comparing the resonance characteristics between a connection assembly of a COCHLEAR BAHA 5 device and a device with the vibration conductor described herein constructed from PEEK or constructed from aluminum.

FIG. 8 illustrates an example chart comparing the resonance characteristics between a connection assembly of a COCHLEAR BAHA 5 device and a device with the vibration conductor 420 described herein constructed from PEEK or constructed from aluminum. As shown, a device with a vibration conductor 420 as described herein can beneficially have a resonance peak at a higher frequency compared to a COCHLEAR BAHA 5 device. This change in frequency can be achieved by the vibration conductor 420 being stiffer than would have been suitable prior designs that had a combination conductor-coupling that needed to be flexible enough to deform to couple with an abutment. The higher frequency peak enables a larger bandwidth for the signal processing. Thus, the connector assembly 240 described herein can allow for a frequency range of the bone conduction device 150 to be extended, such as into the range of 200-9600 Hz. This range is higher compared to previous designs that had a frequency range of 200-7200 Hz.

Connector Assembly Adapter

FIG. 9, which is made up of FIGS. 9A and 9B, illustrates an example implementation of a connector assembly 240 having an adapter 910. FIG. 9B illustrates an enlarged view of a portion of the connector assembly 240. The adapter 910 is a component configured to modify the connector assembly 240. In the illustrated example, the adapter 910 is configured to function as an extension of the vibration conductor 420 that also provides increased length from the housing 242 to the coupling 410. For instance, the adapter 910 can have one or more properties of the vibration conductor 420. In other examples the adapter 910 can be configured to function as the coupling 410 or both the coupling 410 and the vibration conductor 420.

As illustrated, the adapter 910 can be removably disposed between the coupling 410 and the vibration conductor 420. In many examples, the adapter 910 is used to extend the length of the connector assembly 240, which can be beneficial for certain configurations of bone conduction auditory prostheses 100. For instance, the adapter 910 can be configured to extend the length of the connector assembly 240 by 2 mm. The adapter 910 can have a fixed length or an adjustable length. In addition to or instead of being configured to extend the length, the adapter 910 can include one or more sensors, such as a force sensor, an impedance sensor, an implant stability sensor, other sensors, or combinations thereof. These one or more sensors can connect to the sound processor 246 of the bone conduction device 150 or another device to provide data for modifying stimulation provided by the bone conduction device 150, data for diagnostic purposes (e.g., to confirm whether the bone conduction device 150 is functioning as intended), data for other purposes, or combinations thereof.

As illustrated, the adapter 910 includes a second axial interface surface 912 and a third axial interface surface 914. The second axial interface surface 912 is configured to contact the axial interface surface 422 of the vibration conductor 420 and conduct vibrations to the third axial interface surface 914. The third axial interface surface 914 is configured to conduct vibrations to the bone conduction implant 190 via the abutment 192. As illustrated, the adapter 910 can be configured to be disposed coaxially with the coupling 410, the vibration conductor 420, the fastener 430, and the sleeve 440. As further illustrated, the adapter 910 can include a recessed portion configured to receive the coupling 410. When the adapter 910 is installed in the bone conduction auditory prosthesis 100, a proximal portion of the adapter 910 can be disposed within the housing 242 and extend through the opening 260 and a proximal portion of the coupling 410 is disposed outside of the housing 242. The adapter 910 can include a bore through which the fastener 430 can extend.

The adapter 910 can take other forms. In an example, the adapter 910 is disposed such that a proximal end of the adapter 910 is located within the housing 242, with the proximal ends of one or both of the coupling 410 and the vibration conductor 420 being in contact with a distal end of the adapter 910. In another example, the adapter 910 can be configured to connect to the coupling 410 (e.g., by having one or more characteristics similar to that of an abutment 192). In such an example, the adapter 910 can have its own coupling structure (e.g., being the same as or similar to the coupling 410) for connecting to the abutment 192. Other configurations are also possible.

Process

Figure 10:
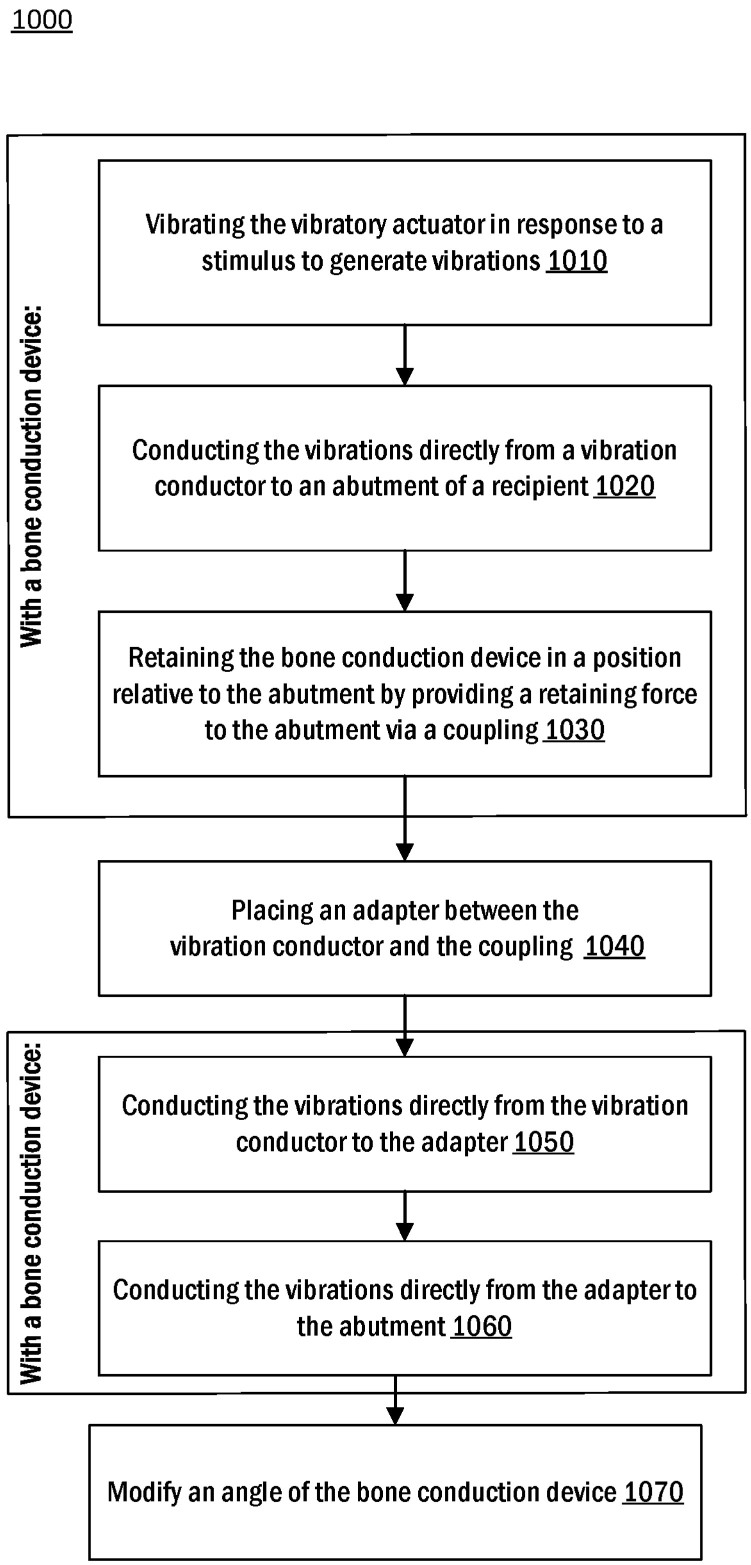
FIG. 10 illustrates a process for providing vibrations to a recipient to cause a hearing percept.

FIG. 10 illustrates an example process 1000 for providing vibrations to a recipient to cause a hearing percept using the bone conduction auditory prosthesis 100. The process 1000 can include performing operations 1010, 1020, and 1030 with a bone conduction auditory prosthesis 100 having a vibratory actuator 250, a coupling 410, and a vibration conductor 420.

Operation 1010 can include vibrating the vibratory actuator 250 in response to a stimulus to generate vibrations. For instance, the sound input device 126 can produce an electronic signal indicating an audio stimulus. The audio stimulus can include audio from a sonic environment proximate the bone conduction auditory prosthesis 100. The sound processor 246 can receive and process the electronic signal to ultimately cause a control signal to be sent to the vibratory actuator 250 to cause the vibratory actuator 250 to vibrate. Following operation 1010, the flow of the process 1000 can move to operation 1020.

Operation 1020 can include conducting the vibrations directly from the vibration conductor 420 to an abutment 192 of a recipient. This operation 1020 can include conducting a vibration from a component of the vibratory actuator 250 to the vibration conductor 420, and then conducting a vibration from the vibration conductor 420 to the abutment 192. In an example, the conduction from the vibration conductor 420 to the abutment 192 is direct in that there are no intermediary components between the vibration conductor 420 and the abutment 192. A surface of the vibration conductor 420 (e.g., the axial interface surface 422) can be in direct contact with a surface of the abutment 192 (e.g., a rim of the abutment 192). Via this direct contact, movement of the vibration conductor 420 can be conducted to the abutment. Following operation 1020, the flow of the process 1000 can move to operation 1030.

Operation 1030 includes retaining the bone conduction auditory prosthesis 100 in a position relative to the abutment 192 by providing a retention force to the abutment 192 via the coupling 410. In an example, the operation 1030 includes providing a retention force that extends radially outward from or radially inward toward the longitudinal axis. For example, an elastically-deformable portion of the coupling 410 can be constrained from expanding outward by the abutment 192 and cause a force to be applied from the coupling radially-outward against the abutment 192. The retention force need not only extend in a radial direction. The retention force can retain the bone conduction device 150 in a position relative to the abutment 192. Alternatively, an elastically-deformable portion of the coupling 410 can be constrained from contracting inward by the abutment 192 and cause a force to be applied from the coupling 410 radially-inward against the abutment 192. In addition or instead, the retaining can be provided by a magnetic retention or a threaded connection. Following operation 1030, the flow of the process 1000 can move to operation 1040.

Operation 1040 includes placing an adapter 910 between the coupling 410 and the vibration conductor 420. For instance, the placing of the adapter 910 can include removing the bone conduction device 150 from its connection with the abutment 192, such as by providing a force to the bone conduction device 150 in a direction parallel to the longitudinal axis. The force can cause the coupling 410 to deform and slide off of the abutment 192. With the bone conduction device 150 removed, the adapter 910 can be added by removing the fastener 430 to allow the coupling 410 to be removed to make room for the adapter 910. Then a proximal portion of the adapter 910 can be placed where the proximal portion of the coupling 410 was installed. Then the proximal portion of the coupling 410 can be placed into contact with the adapter 910, and the fastener 430 can be returned, such that the fastener 430 retains the coupling 410, adapter 910, and vibration conductor 420 in position. In some examples, this operation 1040 can include placing the second axial interface surface 912 in contact with the axial interface surface 422 so vibrations can be conducted directly from the vibration conductor 420 to the adapter 910 via the contact between the surfaces 422, 912. After the adapter 910 is installed, the bone conduction device 150 can be reattached to the abutment 192. In particular, the reattachment can include maintaining the bone conduction device 150 in a position relative to the abutment 192 by providing a retention force to the abutment 192 via the coupling 410. Following operation 1040, the flow of the process 1000 can move to operation 1050.

Operation 1050 includes conducting the vibrations directly from the vibration conductor 420 to the adapter 910. This operation 1050 can include vibrating the vibration conductor 420 via vibrations from the vibratory actuator 250. Then the vibrations of the vibratory actuator 250 can be conducted to the second axial interface surface 912 via its contact with the axial interface surface 422 of the vibration conductor 420. The conduction can be direct by the vibrations not passing through any intermediary components between the axial interface surface 422 and the second axial interface surface 912. Following operation 1050, the flow of the process 1000 can move to operation 1060.

Operation 1060 includes conducting the vibrations directly from the adapter 910 to the abutment 192. The third axial interface surface 914 of the adapter can be in direct contact with a surface of the abutment 192. The vibration of the adapter 910 can cause the third axial interface surface 914 to vibrate and transmit the vibrations to the abutment 192.

In some examples, the process 1000 can include operation 1070, which includes modifying an angle of the connector assembly 240. As described in the following section in conjunction with FIGS. 11-14, while the connector assembly 240 can typically extend substantially perpendicularly to the face of the housing 242 having the opening, in some situations, it can be advantageous to modify the angle of the connector assembly 240 relative to the face of the housing 242. Modifying the angle can occur in any of a variety of ways including modifying the angle at which the connector assembly 240 extends from the housing or modifying an angle of the connector assembly 240. As such, the operation 1070 can include adjusting an adjustable component of the bone conduction device 150 to modify the angle. In other examples, the operation includes replacing the coupling 410, vibration conductor 420, the adapter 910, other components, or combinations thereof to modify the angle.

Angled Connector Assembly

Figure 11:
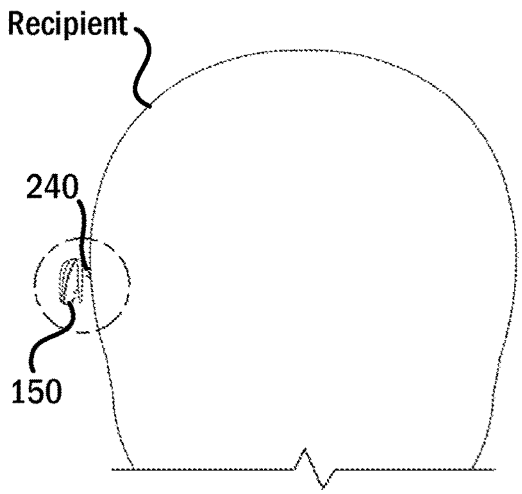
FIG. 11 illustrates a bone conduction device having a connector assembly coupled to a recipient's skull via a bone conduction implant.
Figure 12:
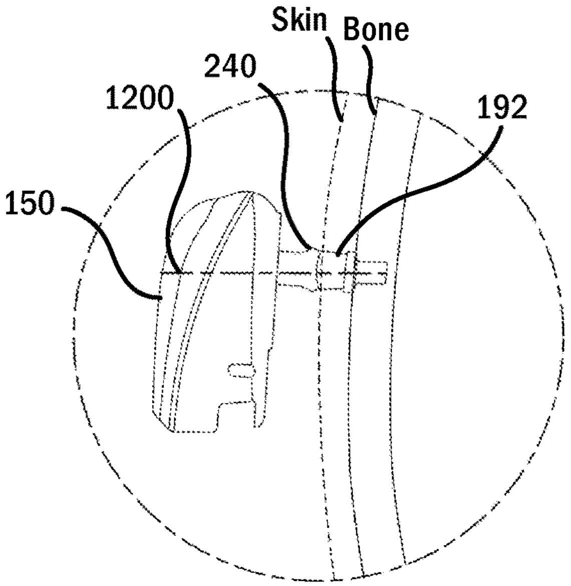
FIG. 12 illustrates a partial cutaway view showing a bone conduction device, a bone conduction implant, and a connector assembly aligned along an axis extending substantially perpendicular to the recipient's skull.

Generally, surgeons endeavor to implant the bone conduction implant 190 substantially perpendicular to the recipient's skin. For example, FIG. 11 illustrates a bone conduction device 150 having a connector assembly 240 coupled to a recipient's skull via a bone conduction implant 190. FIG. 12 illustrates a partial cutaway view of the circled area in FIG. 11 showing the bone conduction device 150, bone conduction implant 190, and connector assembly 240 aligned along an axis 1200 extending substantially perpendicular to the recipient's skull. However, in some cases, a surgeon places the bone fixture 194 angled relative to the axis 1200, such as is shown in FIG. 13.

Figure 13:
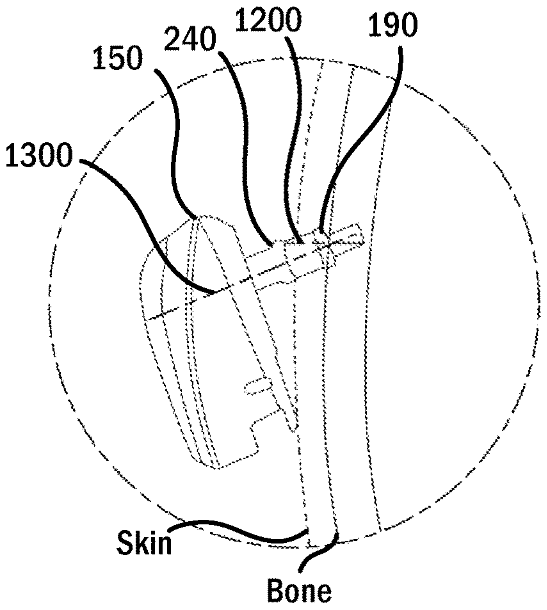
FIG. 13 illustrates a partial cutaway view showing the bone conduction device coupled to a bone conduction implant and having a longitudinal axis that is non-perpendicular to the recipient's skin.

FIG. 13 illustrates a partial cutaway view showing the bone conduction device 150 coupled to a bone conduction implant 190 and having a longitudinal axis 1300 that is non-perpendicular to the recipient's skin. As illustrated, bone conduction implant 190 is installed at a non-perpendicular angle relative to the recipient's skull such that the bone conduction device 150 is angled toward the recipient's skin, which can cause unwanted feedback and discomfort if the bone conduction device 150 contacts the recipient's skin. The bone conduction implant 190, and connector assembly 240 are aligned along a longitudinal axis 1300 that is perpendicular to the face of the bone conduction device 150 from which the connector assembly 240 extends and which is non-parallel to the axis 1200. As illustrated, the angle between the axes 1200, 1300 is sufficient that the bone conduction device 150 contacts the skin.

Figure 14:
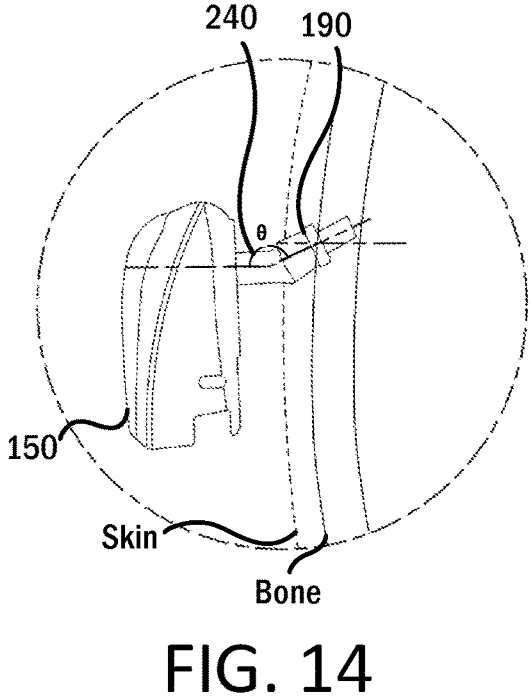
FIG. 14 illustrates a partial cutaway view showing a connector assembly aligned along an axis perpendicular to the recipient's skull despite the bone conduction implant being installed at an angle that is not perpendicular to the recipient's skull.

FIG. 14 illustrates a partial cutaway view showing the connector assembly 240 aligned along an axis perpendicular to the recipient's skull despite the bone conduction implant 190 extending along an axis 1200 that is at a non-perpendicular angle to the recipient's skin. This axis 1200 can be considered the major axis of the bone conduction implant 190 and its components. While this arrangement would typically result in the bone conduction device 150 being angled into the recipient's skin as shown in FIG. 13 when the connector assembly 240 extends along the axis 1300, here the connector assembly 240 has an angle θ that makes up for the difference between the axes 1200, 1300. In particular, the angle of the connector assembly 240 corrects for the angled implantation of the bone conduction implant 190. In an example, the angle θ is at least 5, 10, 15, 20, 25, 30, 35, 40, 45, or 50 degrees away from perpendicular to the housing 242 (e.g., the face of the housing 242 from which the connector assembly 240 extends). For instance, the connector assembly 240 can be configured such that the coupling 410 is angled away from perpendicular to the housing by an angle of at least 10 degrees. Perpendicular to the housing can be determined based an angle relative to a width of the housing 242 or an angle relative to a face of the housing 242 from which the connector assembly 240 extends. The connector assembly 240 can be angled in any of a variety of manner. In some examples, the connector assembly 240 (e.g., the components thereof) can be configured to have an adjustable angle, such that a recipient or a clinician can modify the angle of the connector assembly 240, such as an angle at which the connector assembly 240 extends through the opening 260. In addition or instead, the connector assembly 240 can be adjustable such that a portion of the connector assembly 240 outside of the housing 242 has an adjustable angle. In other examples, the connector assembly 240 (e.g., the components thereof) can be removable to be replaced by components having a fixed angle.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. An apparatus comprising:
- a housing defining an opening;
- a vibratory actuator disposed within the housing;
- a coupling extending through the opening and configured to couple with an abutment; and
- a vibration conductor separate from the coupling and extending through the opening and configured to conduct vibrations from the vibratory actuator to the abutment, wherein the vibration conductor comprises an axial interface surface configured to contact the abutment to conduct vibrations to the abutment.

2. The apparatus of claim 1, wherein the coupling and the vibration conductor are configured to extend through the opening at an adjustable angle.

3. The apparatus of claim 1, wherein the apparatus defines a longitudinal axis along which the coupling and the vibration conductor extend.

4. The apparatus of claim 3, wherein the coupling comprises a radial retention surface configured to mate with the abutment in a direction radial to the longitudinal axis, thereby coupling the apparatus to the abutment.

5. The apparatus of claim 1, wherein the axial interface surface is perpendicular to a longitudinal axis along which the vibration conductor extends.

6. The apparatus of claim 1, wherein the vibration conductor is concentrically disposed around the coupling.

7. The apparatus of claim 1, wherein the vibration conductor is formed from a material comprising a metal and the coupling is formed from another material comprising a plastic.

8. The apparatus of claim 1, further comprising a fastener extending through the coupling and the vibration conductor, wherein the fastener removably couples the coupling and the vibration conductor to a location within the housing.

9. The apparatus of claim 1, wherein the coupling comprises a maximum diameter that is less than a maximum diameter of the abutment.

10. The apparatus of claim 1, further comprising a bone conduction implant having the abutment.

11. The apparatus of claim 1, wherein the vibration conductor at least partially surrounds a portion of the vibratory actuator to expose the axial interface surface for contact with the abutment.

12. An apparatus comprising:
- a housing;
- a vibratory actuator disposed within the housing;
- a coupling extending from the housing and having a radial retention surface for coupling with an abutment;
- a vibration conductor having a distal end extending from the housing and having a first axial interface surface disposed proximate the distal end and configured to conduct vibrations to the abutment; and
- an adapter having a second axial interface surface and a third axial interface surface and being configured to be removably disposed between the coupling and the vibration conductor,
- wherein the second axial interface surface is configured to contact the first axial interface surface and conduct vibrations to the third axial interface surface, and wherein the third axial interface surface is configured to conduct vibrations to the abutment.

13. The apparatus of claim 12, wherein the coupling, the vibration conductor, and the adapter are disposed in a coaxial relationship.

14. The apparatus of claim 12, wherein the adapter is configured to increase a distance between the abutment and the housing when the coupling is coupled with the abutment.

15. The apparatus of claim 12, wherein the coupling extends perpendicular to the housing.

16. The apparatus of claim 12, wherein the coupling is angled away from being perpendicular to the housing by an angle of at least 10 degrees.

17. The apparatus of claim 12, further comprising the abutment.

18. An apparatus comprising:
- a coupling extending along an axis and having a distal end configured to couple with a percutaneous abutment radially with respect to the axis; and
- a vibration conductor extending along the axis and being configured to conduct vibrations to the percutaneous abutment in a direction parallel to a major axis of the percutaneous abutment,
- wherein the coupling is configured for flexibility, and wherein the vibration conductor is configured for vibration transfer.

19. The apparatus of claim 18, further comprising a fastener attaching the vibration conductor and the coupling relative to a vibratory actuator.

20. The apparatus of claim 19, wherein the fastener comprises a head (432) disposed within a concavity of the distal end of the coupling.

21. The apparatus of claim 18, wherein the coupling has a maximum diameter less than a maximum diameter of the percutaneous abutment.

22. The apparatus of claim 18, a further comprising vibratory actuator coupled to a proximal end of the vibration conductor.

23. A method implemented with a bone conduction device having a vibratory actuator, a coupling, and a vibration conductor, the method comprising:
- vibrating the vibratory actuator in response to a stimulus to generate vibrations;
- conducting the vibrations from the vibratory actuator to the vibration conductor, wherein the vibration conductor at least partially surrounds a portion of the vibratory actuator;
- conducting the vibrations from the vibration conductor to an abutment of a recipient; and
- retaining the bone conduction device in a position relative to the abutment by providing a retention force to the abutment via the coupling.

24. The method of claim 23, further comprising:
- placing an adapter between the coupling and the vibration conductor;
- conducting the vibrations from the vibration conductor to the adapter; and
- conducting the vibrations from the adapter to the abutment.

25. The method of claim 23, further comprising:
- modifying an angle of the bone conduction device.

* * * * *